United States Patent Office 2,896,478
Patented July 28, 1959

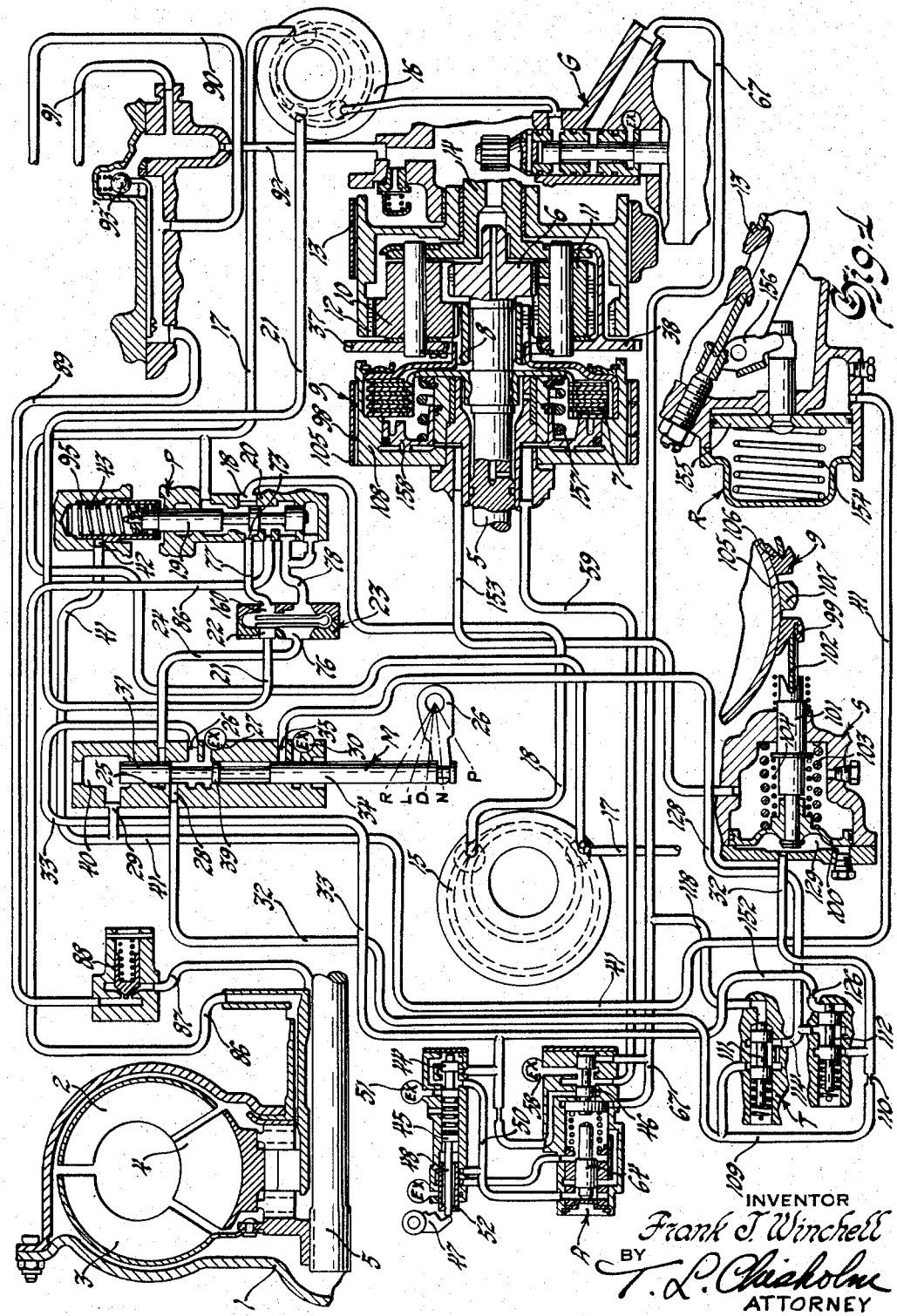

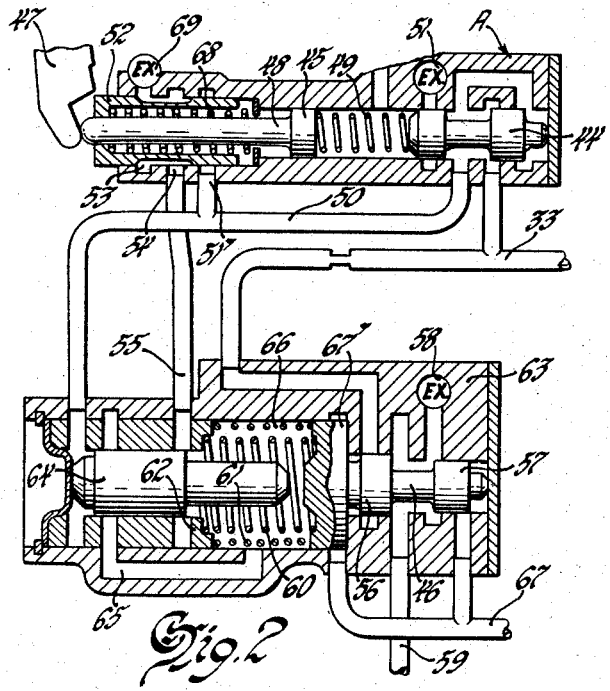
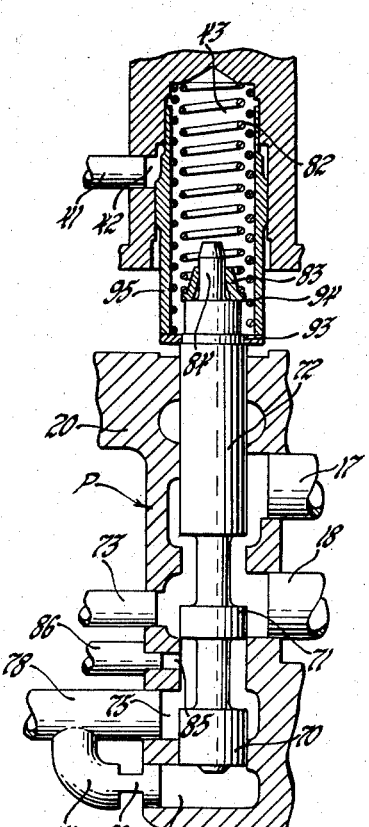
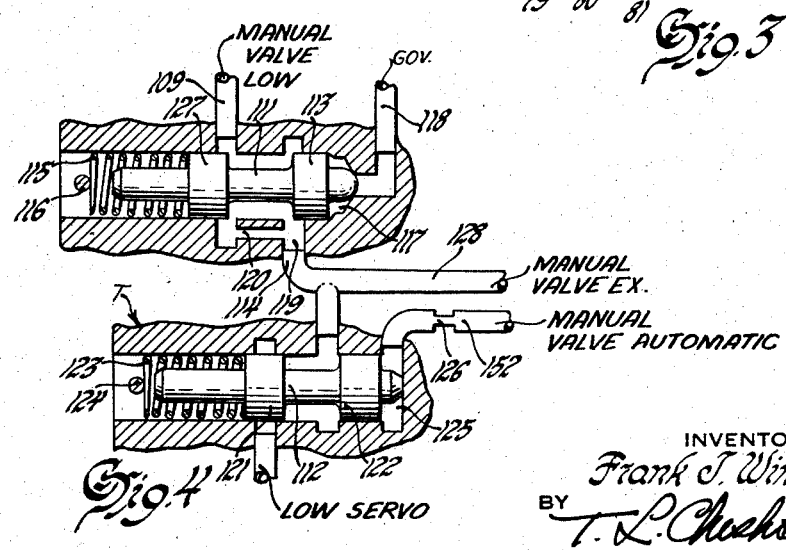

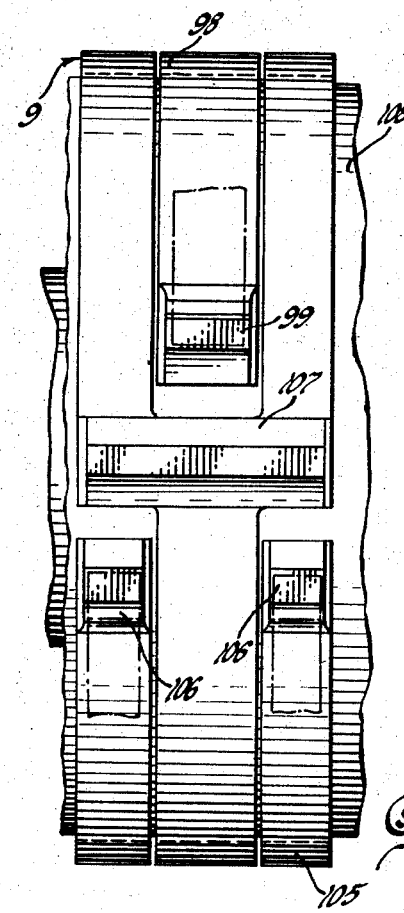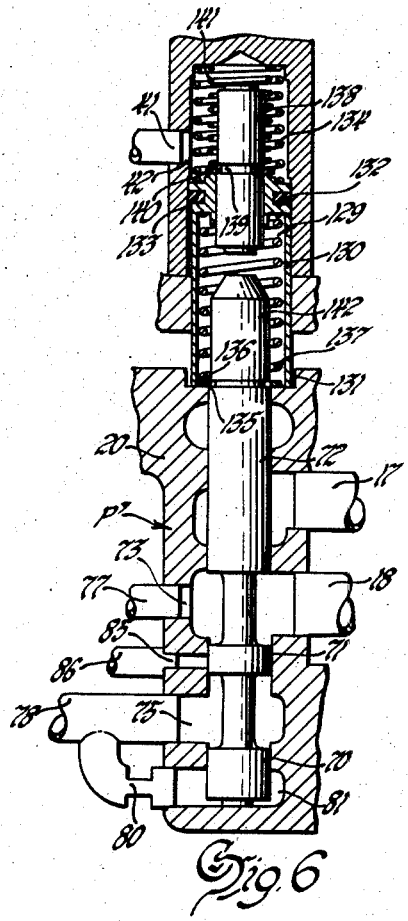

2,896,478

TRANSMISSION CONTROL SYSTEMS

Frank J. Winchell, Franklin, Mich., assignor to General Motors Corporation, Detroit, Mich., a corporation of Delaware Application September 7, 1954, Serial No. 454,581

16 Claims. (Cl. 74—754)

This invention relates to transmissions and more particularly to automatic transmissions of the type employing a hydraulic torque transmitter and automatic step-ratio gearing, and to the control system therefor.

Heretofore various types of automatic transmissions have been employed in vehicles with considerable success. In previous automatic transmissions that utilize step-ratio gearing, while efficient in operation, generally have had one particular disadvantage in that certain shifts of the gearing are rough and objectionable. These rough shifts are particularly evident during downshifts. This is because downshifts are made under varying operating conditions, whereas upshifts are generally made under similar conditions and can be fairly easily controlled. For example, downshifts are made under both low and high speed engine and vehicle conditions. The downshifts are also made under both low and high torque conditions. The transmission can usually be designed to provide smooth downshifts under a particular set of conditions. However, as explained above, the downshifts are made under varying conditions and a design for one set of conditions will provide rough downshifts under other conditions.

In general, shifts can be made smooth in several ways. One method is to vary the pressure on the torque carrying friction elements such as bands and clutches that control the gearing under different conditions. This is to insure that the band or clutch has the correct torque carrying capacity. If this is done the release of torque by the torque carrying element will be smoother and less noticeable.

The shifts can also be made smoother by timing the shifts, i.e., delaying or hastening the release or application of a torque carrying element or reaction sustaining element such as a clutch or band.

It has been found that one of the reasons for rough downshifts is that the direction of torque through the drive train is reversed during the shift. An objectionable lurch is felt where the engine, which has been driving the vehicle, suddenly becomes driven by the vehicle. It has been found that if this reversal of torque during a shift can be prevented, the shift will be considerably smoother.

For example, during an open throttle downshift where the operator is accelerating the vehicle, the engine is initially driving the vehicle. If a torque carrying connection, such as a clutch, is released, the transmission will be in neutral until another torque carrying connection is made and a positive drive again established in the transmission. It has been found that under different speed conditions the length of time the transmission should be in neutral to effect a smooth shift will vary.

Upon shifting down at light or closed throttle the vehicle is already driving the engine. Here a different set of conditions exist that necessitate a different control of the ratio change. On placing the transmission in gear after being in neutral with the engine idling, a similar set of conditions exist.

Accordingly it is an object of this invention to provide a control system for a transmission wherein ratio changes are made smoothly and without objectionable lurching or jerking.

Another object of the invention is to provide a transmission control system wherein shifts can be made under varying operating conditions and wherein the time interval between the start of the shift and the end of the shift is varied by these conditions so as to provide smooth and unobjectionable shifts.

A further object of the invention is provide a control system for a transmission having a simple and yet effective control of fluid pressure in the system so as to provide optimum operating pressures under varying conditions.

These and other objects, features and advantages of this invention will be apparent from the following specification and claims taken in conjunction with the accompanying drawings, in which:

Fig. 1 is a schematic diagram of the transmission control system as well as the torque converter and step-ratio gearing in relation to the control system;

Fig. 2 is an enlarged view illustrating the shift valve, throttle valve and forced downshift valve for controlling admission of fluid pressure to, and exhaust of pressure from the transmission servo members;

Fig. 3 is an enlarged view of the pressure regulator valve for controlling the line pressure;

Fig. 4 is an enlarged view of the timing valves for controlling the rate of flow of fluid under pressure to the forward reduction band servo;

Fig. 5 is an enlarged elevational view of the forward reduction band;

Fig. 6 is an enlarged view of a modified form of pressure regulator valve that could be used in place of the valve shown in Figs. 1 and 3;

Fig. 7 is an enlarged view of different forms of timing valves that could be used in place of those in Figs. 1 and 4 and further showing a slightly different manner of connecting the valves to the control system;

Figure 8:
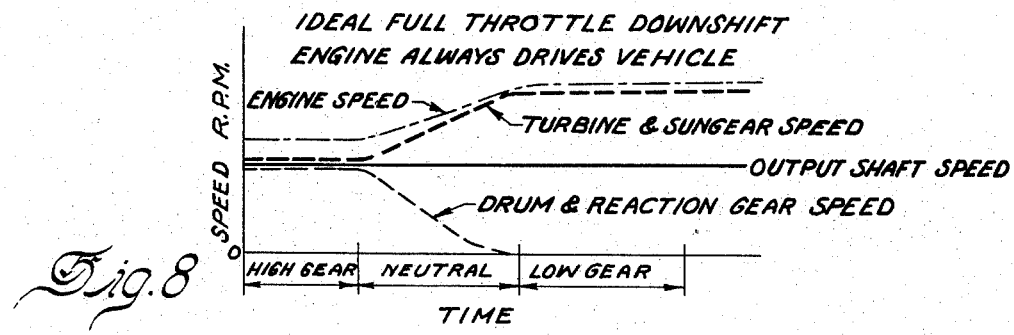
Fig. 8 is a graphical showing of the speeds of certain elements in a transmission during a smooth downshift.

The control system of the present invention may be used with a transmission that is fully described in the copending application of Oliver K. Kelley and Robert S. Plexico, S.N. 291,692, filed June 4, 1952. Consequently, all the details of the transmission are not disclosed in the present application. The transmission consists of a hydraulic torque converter adapted to drive a two-speed planetary step-ratio gearing unit in turn adapted to drive a vehicle load shaft. The torque converter is driven by means of flywheel 1 which in turn drives an impeller 2, a turbine 3, and a fluid reaction member 4. The turbine 3 is connected to drive the input shaft 5 of the planetary gearing. The input shaft 5 carries with it a sun gear 6 that meshes with a long planet pinion gear 11 carried by a planetary carrier that is connected to the output shaft 14. The input shaft 5 is adapted to be connected by means of multiple disc clutch 7 to a second sun gear 8 that rotates with a drum 108 and meshes with a short pinion gear 10 also carried by the planetary carrier connected to the output shaft 14. The long pinion 11 and short pinion 10 are in engagement with each other as well as their respective sun gears. Short pinion 10 is also in engagement with a ring gear 12 mounted for rotation about the output shaft 14 and adapted to be held from rotation at times by friction brake band 13.

The sun gear 8 in addition to be adapted to be clutched the the input shaft 5 can be held against rotation by friction brake band 9. The brake band 9 is a double-wrap band whose construction is shown in Figs. 1 and 5. The details of the band are fully shown in the co-pending application of Edward J. Vosler and Harold W. Schultz, S.N. 439,578, filed June 28, 1954. Referring to Fig. 5, the band is composed of a Y-shaped band wound twice around the drum, the single center portion of the Y 98 having on its free end a lug 99 adapted to be moved by the servo S. Piston 100 acts on rod 101 and member 102 to apply the band. Springs 103 and 104 act through the piston 100, rod 101 and member 102 to release the band. The parallel outside portions 105 of the Y band have lugs 106 formed therein that are fastened to a fixed portion of the transmission and act as anchor members for the band. A central reinforcing strut 107 is fixed to the outer portions as well as the central portion at their junction. Because the band does not have any axial movement there are no axial thrust forces, and further because of the double wrap structure the band has a large torque capacity. Because of the double wrap construction the band has a greater windup effect similar to a spring clutch and consequently has a greater self-energizing effect.

Briefly, the operation of the planetary gearing is as follows. When the clutch 7 and band 13 are released and band 9 applied to hold sun gear 8, the input shaft 5 drives sun gear 6 which in turn drives the long pinion 11 which meshes with short pinion 10 that meshes with stationary sun gear 8. This causes the short planet pinion to walk around sun gear 8 and rotate the carrier thereby driving at a reduced speed. When both bands 9 and 13 are disengaged and clutch 7 is applied, input shaft 5 drives both sun gear 6 and sun gear 8 through clutch 7 tending to cause the long pinion 11 and short pinion 10 to be driven at different rates thereby causing the planetary unit to be locked up.

Reverse operation of the transmission is obtained by releasing band 9 and clutch 7 and applying band 13 by means of reverse servo R to hold the ring gear 12 stationary. The drive then is from input shaft 5 to sun gear 6, planet pinion 11 and to short pinion 10. Because pinion 10 is in mesh with stationary ring gear, pinion 10 walks around inside the ring gear 12 in a reverse direction causing the planet carrier and output shaft 14 to be rotated in the reverse direction and at a reduced speed.

The control system as shown in Fig. 1 comprises a pressure supply system including a pump 15 adapted to be driven by the engine shaft and an output pump 16 driven by the output shaft 14. The control system further includes a pressure regulator valve P that regulates pressure in the main line leading to a manual valve M that controls flow of fluid to the low servo S by way of a timing valve assembly T, an automatic shift control unit A and a reverse servo R.

*Fluid supply*

The pumps 15 and 16 are connected on their input sides to passage 17 leading to a sump or reservoir of oil (not shown). The output of pump 15 passes into conduit 18 leading to the regulator valve body 20. The output of the rear pump 16 passes into conduit 21 which leads to port 22 of the check valve 23. A separate output from pump 16 leads to a governor G that is driven in proportion to the speed of the output shaft 14. This governor G may be any form of governor controlled pressure regulator valve that produces a pressure that varies in accordance with the speed of the governor. The complete details of the governor are not shown, however, reference is made to co-pending application of Maurice S. Rosenberger, S.N. 322,106, filed November 22, 1952, now Patent No. 2,762,384, which application fully describes a form of governor that could be utilized in the present invention.

The check valve 23 serves to prevent the front pump 15 from bleeding to the rear pump 16 when the vehicle and rear pump are in reverse. At low vehicle speeds the front pump acting through conduit 18, the regulator valve P and conduit 77 leading to port 160 of the check valve 23 supplies most of the fluid. When the vehicle speed has increased so that the rear pump 16 is rotating fast enough to supply the necessary volume and pressure of fluid to operate the transmission, the regulator valve P will begin to exhaust the front pump pressure in lines 18 and 77 through the pump intake passage 17. At this time pressure in conduit 21 from the rear pump 16 moves the check valve 23 to close the port 160. The operation of the pressure regulator valve will be described in detail hereinafter.

*Manual valve*

Main supply line 24 leads from the check valve to port 25 of the manual valve M. This line 24 at all times carries whatever fluid under pressure is produced by the pumps and regulated by the regulator valve P. Manual valve M is moved by means of a lever 26 connected to a manual control element adapted to be operated by the vehicle driver through suitable linkage (not shown). The manual valve has in addition to port 25, ports 26, 27, 28, 29 and 35. The valve can be moved by control lever 26 into five positions indicated by the dotted lines in Fig. 1. These positions are R for reverse, L for manual low, D for automatic drive, N for neutral, and P for park.

With the manual valve M in N or neutral position as shown in Fig. 1, oil supply to all controls is interrupted by closing line 24. At the same time port 28 connected to passage 32 leading to the apply side of the low servo S, and passage 33 leading to the automatic shift valve are exhausted through ports 28, 26 and 27. Lower land 34 blocks port 35 connected to passage 128 leading from the timing valve group T that controls the low servo S.

When the manual valve M is moved downward from the position shown in Fig. 1, to P or park position by lever 26, the port 25 is blocked as in neutral, ports 28 and 26 are also blocked and port 35 connected to passage 128 is connected to exhaust port 30. Upon movement of the lever 26 to P position a pawl ratchet (not shown) ratchets into engagement with the teeth 37 formed on the output carrier member 38. This positively locks the output shaft 14 of the transmission and prevents the car from moving.

If the manual valve M is moved to D or automatic drive position by lever 26 as controlled by the selector lever, fluid under pressure from port 25, leading from the pressure regulator valve P, is allowed to pass between lands 31 and 39 to port 28 and passage 32 to the low servo S and its timing valve assembly T which will be described in detail below. This fluid acts in chamber 129 on piston 100 to apply the band 9, thus placing the gearing in forward reduction gear. At the same time fluid under pressure from port 25 is allowed to pass between lands 31 and 39 to port 26 and passage 33 leading to the automatic shift control unit A, the construction and operation of which will also be described below. Upon attainment of certain operating conditions of the transmission described below, the automatic shift unit A will allow line pressure to apply the clutch 7 and at the same time act to release the low band 9. This will condition the gearing for the direct drive. Port 35 and passage 128 are at this time blocked by land 34.

Upon movement of the manual valve M to L or manual low position, fluid under pressure from port 25 is allowed to pass between lands 31 and 39 to port 28, passage 32 and the low servo S as was the case in the D position of the manual valve. In this position of the manual valve passage 33 leading to the automatic shift unit A is exhausted between lands 39 and 34 and port 27. Operation of the automatic shift unit A will then have no effect and the transmission cannot shift up. Port 35 is again blocked by land 34.

To place the transmission in reverse the manual valve M is moved by lever 26 to the R position whereby fluid under pressure from passage 24 and port 25 is allowed to pass into the chamber 40 above the manual valve and into port 29 and passage 41. This passage 41 is connected directly to the reverse servo R which acts to apply the reverse band 13, conditioning the transmission for reverse drive as described above and at the same time allow fluid under pressure to pass to port 42 and sleeve 95 above the pressure regulator valve 19 to urge that valve down and condition the same for high pressure operation, as will be described in more detail below. Passage 32 leading from the low servo S and passage 33 leading from the automatic shift unit A are at the same time connected to exhaust port 27 by the reduced valve portion between lands 31 and 39. Port 35 is again blocked by land 34.

*Automatic shift unit*

The automatic shift unit A, which controls the shift between low forward reduction and forward direct drive of the gearing, comprises three valves, a throttle operated valve hereinafter designated a TV valve 44, a forced downshift valve 52, and a shift valve 46. The TV valve 44 and downshift valve 52 are controlled by lever 47 connected by suitable linkage to the engine accelerator pedal (not shown).

Upon movement of the accelerator pedal between closed throttle and wide open throttle positions the plunger 48 acts through spring 49 (Fig. 2) to urge the TV valve 44 to the right with a varying force dependent on throttle opening. The valve 44 meters line pressure from line 33 by either connecting line 33 to TV passage 50 or exhaust port 51. The pressure existing in passage 50 acts on the right end of the TV valve 44 to oppose the force of spring 49 to regulate the pressure in line 50 proportional to amount of throttle opening, as is known.

Upon depression of the accelerator pedal beyond wide open throttle position the lever 47 acts to move sleeve valve 52 to the right (Fig. 2) thereby connecting passage 50 by means of port 51, reduced portion 53 and port 54 to passage 55 leading to the shift valve 46 causing this to shift down or move to the right as seen in Figs. 1 and 2. The shift valve 46 comprises a spool valve having lands 56 and 57 that act to connect passage 33 either to exhaust port 58 or clutch apply passage 59 as explained below. The shift valve 46 is urged to the right as seen in Figs. 1 and 2 into the downshifted or clutch exhaust position by springs 60 and 61 that bear against abutment 62 formed in the valve body 63. The valve 46 is also urged to the downshifted or right hand position by TV regulator plug 64 that is acted upon by TV pressure leading from line 50 and controlled by TV valve 44. Upon movement of the plug 64 to the right, TV pressure from line 50 is also allowed to pass through passage 65 to chamber 66 and act on the large left-hand portion 57 of shift valve 46.

Shift valve 46 is urged to the upshifted or lefthand position, as shown in Figs. 1 and 2, by governor pressure in passage 67 connected to the extreme righthand end of valve 46 and to the righthand side of the large land 67'. This governor pressure in line 67 is varied by means of governor G in approximate proportion to speed of the output shaft 14. The operation of this governor G is not described in detail in this application as it is fully described and shown in the application S.N. 322,106 to Maurice S. Rosenberger, referred to above. It is sufficient to say that the pressure in passage 67 varies with the speed of the output shaft 14 and hence the speed of the vehicle. The shift valve 46 is moved between its two extreme positions, i.e. its right hand or clutch-exhaust position and its lefthand or clutch-apply position, depending on the TV pressure in line 33, the governor pressure in line 67 and the force of springs 60 and 61.

*Forced downshift*

It should be noted that when the shift valve 46 is in its lefthand position and the regulator plug 64 is in its lefthand position as shown in Fig. 2, TV pressure from passage 50 acts only on the TV plug 64 and cannot act through passage 65 to act on the large end of the shift valve. This means that the transmission will downshift at a lower vehicle speed and governor pressure than is required to upshift the transmission, because of the TV pressure acting on a much smaller area when the shift valve and regulator plug 64 are in their upshifted positions. Upon movement of the accelerator pedal past its wide open throttle position, the lever 47 contacts the sleeve 52 and moves this sleeve against spring 68 that reacts through the linkage and the accelerator pedal to signal the driver that he is moving the sleeve 52. The downshift sleeve 52 is then moved to the right to a position whereby TV pressure from line 50 passes through ports 51', reduction portion 53, port 54 and passage 55 to chamber 66 where the TV pressure again acts on the large portion 67' of the shift valve 46, and if the governor pressure in passage 67 is not too great, then it will cause the shift valve 46 to move to the right into its clutch-exhaust or downshifted position. When the governor pressure in passage 67 reaches a sufficient value, or upon release of the accelerator pedal from its downshift position allowing sleeve 52 to connect passage 55 to exhaust port 69, shift valve 46 will again move to its lefthand or upshifted position. The operation of the shift valve and its control by the governor and accelerator pedal, as well as the accelerator pedal forced downshift, is fully described in S.N. 291,692, referred to above.

A downshift can also be obtained at any time by movement of the manual valve M to the L or manual low position. In this position the manual valve cuts off the supply of fluid to the automatic shift unit, and the clutch apply and band release pressure in conduit 59 is relieved through the shift valve 46, passage 33, port 26 and exhaust port 27 of the manual valve M. This causes a downshift of the transmission with the band applied by the low servo S and the clutch released by spring 157.

*Pressure regulator valve*

The pressure regulator valve P acts to regulate the pressure of the fluid in passages 78 and 24 according to certain operating conditions of the transmission. The valve as shown in Figs. 1 and 3 comprises a spool valve having three lands 70, 71 and 72. The valve is slidably mounted in a valve body 20 that is formed with an outlet port 73 connected to a check valve 23 and an inlet port 18 connected to the output of the front pump 15. The valve is also connected by port 75 to the check valve 23. The check valve chamber 76 is fed by line 21 leading from the rear pump 16, or lines 77 and 18 from the front pump 15. Pressure in the chamber 76 acts through passages 78 and 79, restriction 80 and chamber 81 on the lower end of the regulator valve, land 70 to urge the valve upwardly. A spring 82 mounted in the valve body acts on sleeve 83 surrounding the reduced portion 84 of the valve to urge the valve downwardly.

As the volume of fluid delivered by the front and rear pumps increases, the pressure in chamber 81 builds up, causing the valve to move up against spring 82. When the pressure reaches about 50 p.s.i. the valve will have moved up to a position where excess fluid and pressure is relieved through restriction 85 to the converter feed passage 86. If the speed of the front or rear pump increases still further, thereby supplying a greater volume of fluid, the restriction 85 cannot relieve sufficient fluid to prevent the pressure in passages 78, 79 and chamber 81 from continuing to build up. The valve will continue to move up further until fluid from the front pump in line 18 begins to exhaust through passage 17 back to the pump intakes. In order for the valve to move into this position it must act against collar 93 normally held against a seat in the valve body by a spring 94. The valve must also continue to move against spring 82. With the excess fluid being exhausted through the fixed orifice 85, the pressure in passage 78, 79 and 81 will vary as the square of the total volume of fluid produced by the front and rear pumps. As the output from either pump is directly proportional to its speed, if the speed of one of the pumps is constant, the pressure in chamber 81 will vary as the square of the speed of the other pump. If the pressure in chamber 81 increases to about 90 p.s.i. the valve will have moved upward against springs 82 and 94 to where fluid in passage 78 begins to exhaust around land 71 into the pump intake passage 17. The pressure in chamber 81 must therefore increase from 50 p.s.i. to 90 p.s.i. to move the valve from a first position where all of the fluid being relieved passes through orifice 85, to a second position where fluid is also relieved through passage 17. As the pressure in chamber 81 varies as the square of the volume output of the pumps, then it can be seen that between a certain minimum volume pump output and a maximum output the pressure in line 78 will vary with the output. Thus below a certain minimum volume total output of the front and rear pump the pressure in line 78 will be maintained at 50 p.s.i., above that minimum the pressure rises with an increase in output until the pressure reaches 90 p.s.i. whereupon a further increase in output has no effect on the pressure.

At some point of increase in pump output the regulator valve will begin to exhaust the front pump to the intake passage 17 after which the rear pump alone will be supplying the fluid to passages 78, 79 and chamber 81, the excess fluid from the rear pump being exhausted through the orifice 85 to the converter and also to the intake passage 17.

If the output from the pumps 15 and 16 drops off as in the case where the vehicle slows down and the engine also slows below a certain speed, the springs 82 and 94 will move the valve down cutting off relief of excess pressure through passage 17. A further decrease in pump output will enable the restricted port 85 to relieve the pressure, in which case the presure level maintained in line 78 and chamber 81 will fall off from the 90 p.s.i. level with a decrease in pump output until the spring 94 has expanded sufficiently to urge the collar 93 into its seat in the valve body, at which time the spring 94 cannot exert a force on the regulator valve. At this time with only spring 82 again acting, the pressure will be maintained at 50 p.s.i.

When the manual valve is placed in reverse or R position, regulated line pressure in line 41 acts on sleeve 95 and collar 93 to urge them downwardly against the regulator valve. This force aids the springs 82 and 94 to urge the valve P downwardly. This will cause a still higher pressure, in the neighborhood of 150 p.s.i., to be maintained in line 78 whenever the manual valve M is positioned for reverse.

It will be seen from the above that there has been provided a novel form of pressure regulator valve for a vehicle transmission that will maintain a low pressure level for application of servo operated bands or clutches when the engine and vehicle are at a low speed, will provide an increasing pressure as the speed of the engine or vehicle increases, and will maintain a fixed high level when the engine or vehicle speeds are above a certain high level.

*Torque converter, lubrication and cooling*

The restricted port 85 of the regulator valve P is the sole supply of fluid to the torque converter. Excess fluid from the regulation of the line pressure by the regulator valve passes through line 86 into the torque converter. Excess pressure in the torque converter is relieved through passage 87, relief valve 88, passage 89 and then if the oil is at a high temperature to passage 90 leading to a transmission oil cooler (not shown) and from which it returns to passage 91 then to line 92 leading to the transmission clutch and gearing for cooling and lubrication thereof. If the oil is cool it passes directly from passage 89 past a thermostatically controlled valve 93' into the lubrication passage 92.

*Low servo timing valves*

A timing valve assembly, generally indicated T in Figs. 1 and 4, provides for smooth downshifts under varying conditions outlined above.

Whenever the manual valve M is positioned for low or drive operation, fluid under pressure is allowed to pass through port 28 into passage 109. This passage connects to the low servo S so that pressure can act on the lefthand end of piston 100 and apply the forward reduction band 9. The rate of flow and hence the rate of application of band 9 is controlled by means of timing valve assembly T. Passage 109 from the manual valve M is continuously connected through orifice 110 to chamber 129 on the apply side of piston 100 in the low servo S and hence fluid under pressure can always pass into or out of chamber 129 at a fixed slow rate. At times a higher rate of flow to the servo is provided. The timing valve assembly T comprises two valves, a governor sensitive valve 111 and a line pressure sensitive valve 112. As seen in Figs. 1 and 4 valve 111 is a spool valve having two lands 127 and 113 that control the flow of fluid from passage 109 into a branch passage 114. As shown in the figures the valve 111 is urged to its righthand position by a spring 115 that bears against a stop pin 116, the other end of the spring acting on the lefthand side of the land 127. In this righthand position of the valve 111, fluid under pressure from passage 32 is allowed to freely pass between lands 127 and 113 into the passage 114. To the right of valve 111 there is formed a chamber 117 connected by a passage 118 to governor line 67, the pressure in which is controlled by the output shaft governor driven shaft G. When the speed of the vehicle increases the governor G causes an increased pressure in passage 67, 118 and chamber 117 to act on valve 111 to urge it against its spring 115. When the vehicle speed has increased to approximately 27 m.p.h. the governor pressure is sufficient to move the valve 111 to the left where land 113 blocks port 119 thereby forcing fluid from line 32 to pass only through restricted passage 120 to the low servo S.

The second timing valve 112 is in series with timing valve 111 and has lands 121 and 122 that control the flow of fluid from branch passage 114 to the apply side of the low servo S. Valve 112 is urged to its righthand position by a spring 123 bearing against a stop pin 124. To the right of valve 112 a chamber 125 is connected by means of a restricted passage 126 to the automatic shift unit supply passage 33. Thus whenever the manual valve M is positioned for D or automatic drive range and where fluid under pressure is supplied to the automatic shift unit A through passage 33, fluid acts through passage 126 and chamber 125 to urge the valve 112 to the left. It was noted above in the description of the pressure regulator valve P that during forward operation of the transmission the pressure is regulated at or between two levels. At low engine and vehicle speeds, pressure is regulated at a low level, say approximately 50 pounds p.s.i., and when the speed of either the engine or vehicle is increased, the line pressure increases to a higher level, for example in the neighborhood of 90 p.s.i. The spring 123, and the area of valve 112 exposed to fluid in chamber 125, are selected so that when the line pressure is at the lower level, spring 123 is sufficiently strong to hold the valve 112 in its righthand position, whereby land 121 blocks flow of fluid from passage 114 to the low servo. When the pressure increases to approximately 65 p.s.i., fluid in chamber 125 will move the valve 112 against the spring 123 to engage stop pin 124, whereby fluid may freely pass from the passage 114 between lands 121 and 122 to the low servo.

It will be seen from the above that there are three possible rates of flow into or out of the apply side of the low servo S. Thus, when the line pressure is being regulated at a level below 65 p.s.i. by regulator valve P, valve 112 blocks flow through the timing valve assembly T and fluid can only pass through the restriction 110. This condition would exist when the engine is rotating relatively slow, for example, with the throttle in closed or almost closed position and with the vehicle moving at a low speed, for example below 12 m.p.h. With the line pressure being maintained above 65 p.s.i. by regulator valve P, line pressure sensitive valve 112 opens to connect passage 114 and the low servo whereby fluid can by-pass the restriction 110 at a rate depending upon the position of governor control valve 111. With the vehicle traveling at a relatively low speed, for example, below 27 m.p.h., the valve 111 will be in the position as shown in the figures and will allow free flow between passage 32 and 114 and whereby the band 9 will be applied at a relatively fast rate by piston 100. If the vehicle is moving at a relatively faster speed, for example, above 27 m.p.h., the governor pressure will be high enough to move the valve 111 to its lefthand position, whereby fluid is permitted to flow only through a restriction 120. The flow to the apply side of the low servo S will then be the sum of the flow through restrictions 110 and 120. This flow is at an intermediate rate from that of the two above-mentioned conditions and hence reduction band 9 will be applied at an intermediate rate.

Branched passage 114, that joins the governor sensitive timing valve 111 with the line pressure sensitive timing valve 112, is connected to the manual valve by conduit 128. When the manual valve M is moved from L or D position to R position, low servo apply fluid in line 109 and the low servo apply chamber 129 is exhausted between lands 34 and 39 to exhaust port 27 of the manual valve. When the manual valve M is moved from L or D position to N or neutral, fluid in line 109 and the low servo apply chamber 129 is exhausted between lands 31 and 39 to exhaust port 27 of the manual valve. When the manual valve M is moved to P or park position, conduit 128 serves to exhaust the fluid through port 35 and exhaust port 30 of the manual valve. Any fluid in the servo apply chamber 129 will pass through valve 111 to conduit 128 because the manual valve will only be moved to park position when the vehicle is stationary and at that time valve 111 will be in its open position whereby conduit 109 and 114 are freely connected.

*Modified form of pressure regulator valve*

In Fig. 6 there is shown a modified form P′ of a pressure regulator valve. This valve can be substituted in the control system of Fig. 1 for the valve P shown in Figs. 1 and 3. The operation and porting of the valve P′ is identical with that of valve P shown in Figs. 1 and 3 only the arrangement of springs and sleeves utilized to urge the valve downward is different. Located above the regulator valve there is a cylindrical chamber 129 having slidably mounted therein a sleeve 130. This sleeve bears on its lower end against a recess 131 formed in the valve body 20. Mounted in the cylindrical chamber 129 also is a piston member 132, having a sealing member 133 formed thereon, that bears against chamber 129. This piston 132 is urged downwardly against sleeve 130 by spring 134, the upper end of which bears against the top portion of the chamber 129. The regulator valve has a shoulder 135 formed thereon, on which a collar 136 rides. Located between the piston 132 and the collar 136 is a spring 137. The piston 132 carries therein a plug 138 having a reduced portion 139 in which is mounted a ring 140. This ring 140 is urged down against the top of the piston 132 and the plug 138 by spring 141 that also bears against the top of the chamber 129.

It can be seen that when the regulator valve is in its lower position the valve is held in that position by spring 137 acting on collar 136. When the volume of fluid produced by the front pump 15 and rear pump 16 is small, fluid under pressure in line 78 passes through restriction 80 to act on the lower end of the valve to move it upwardly against spring 137, whereby excess fluid is relieved through restricted port 85 into the torque converter feed passage 86. Thus the spring 137 shown in Fig. 6 performs the same function as spring 94 of the form in Figs. 1 and 3. If the volume of fluid produced by the pumps increases, restricted port 85 cannot relieve the fluid sufficiently fast to prevent the pressure in chamber 81 from increasing and thus forcing the valve still further upward until the upper portion 142 of the valve engages the lower end of the plunger 138 and begins to move it against ring 140 and spring 141. A further increase in the volume of fluid from the pumps causes the pressure in line 73 to rise as the square of the volume output, as in the case of regulator valve P described above. The pressure rises from the 50 p.s.i. level maintained by the spring 137 acting alone until the pressure is 90 p.s.i., at which time a further increase in volume output moves the valve P against both spring 137 and spring 141 into position where fluid is also relieved into the pump intake passage 17. The pressure then will be maintained at a high level of 90 p.s.i. All of this time the spring 134 has held piston 132 against the sleeve 130 which acts as a stop for the downward movement of the piston 132, ring 140 and plunger 138.

When the manual valve is placed in R or reverse position, line pressure is admitted to passage 41 where it enters into the chamber 129 above the piston 132 and acts on the top area of the plunger 138 to aid the spring 141 in urging the valve downward. As in the case of the valve shown in Figs. 1 and 3 this increased force tending to urge the valve downward causes the valve to regulate the pressure in line 78 at a still higher level. Piston 132 and seal 133 serve to prevent fluid under pressure in chamber 129 from leaking past sleeve 130. Thus it can be seen that the valve P′ shown in Fig. 6 could be used in the place of the valve P in Figs. 1 and 3 and its operation and function and these valves are essentially the same.

*Modified form of timing valves*

Fig. 7 shows a modified form of timing valve assembly T′. In place of the stop pins 116 and 124 used to hold the springs 115 and 123 in position, and also utilized to act as stops for movement of the valve 111 and 112 respectively, there could be substituted clips 143 and 144 mounted in the valve body. These clips serve the same function as the pins 116 and 124 but allow the use of longer springs 145 and 146 that urge the timing valves to their righthand position.

The upper most of the two valves shown in Fig. 7 is a governor sensitive timing valve that is constructed and operates in the same manner as the valve 111 in Figs. 1 and 4. The lower most valve 147 of Fig. 7 is a slightly modified version of valve 112 of Figs. 1 and 4. A branched passage 148 is connected to passage 114 and leads to chamber 149 formed on the righthand end of the valve 147. The valve 147 is responsive to pressure in the passages 109, 114 and 148 and chamber 149 so that when the pressure in these last-mentioned passages is below a fixed level, spring 146 holds the valve 147 in its righthand position, as shown in Fig. 7, whereby land 150 blocks the flow of fluid between passages 114 and the apply chamber 129 of the low servo. This fixed level is that level maintained in the system by either of the pressure regulator valves P or P′ described above in their low pressure range of operation. When the valve P or P′ regulates the pressure in the system at the higher level, i.e. when either the engine or vehicle speeds are relatively high, pressure acting through passage 109, passage 114, 148 and chamber 149 acts to move the valve 147 against the spring 146 whereby fluid is permitted to pass between lands 150 and 151 to the apply chamber 129 and the low servo S. This construction differs from that shown in Figs. 1 and 4 in that the valve 147 is sensitive to line pressure whenever the manual valve is in L or D positions because passage 109 has fluid under pressure therein during both low and drive range operation. In the form shown in Figs. 1 and 4 the line pressure sensitive valve 112 is sensitive to line pressure only when the manual valve is positioned for D or automatic drive operation. If the timing valve assembly T' is substituted for the valve assembly T shown in Figs. 1 and 4, the passage 152 and restriction 126 would be eliminated as the passage 148 connected to passage 114 eliminates the need for passage 152. The operation of the valves in Fig. 7 to provide three different rates of flow to and from the apply side of the low servo S is the same as the operation of the valves 111 and 112 in Figs. 1 and 4, described above.

Open throttle downshifts

Figure 10:
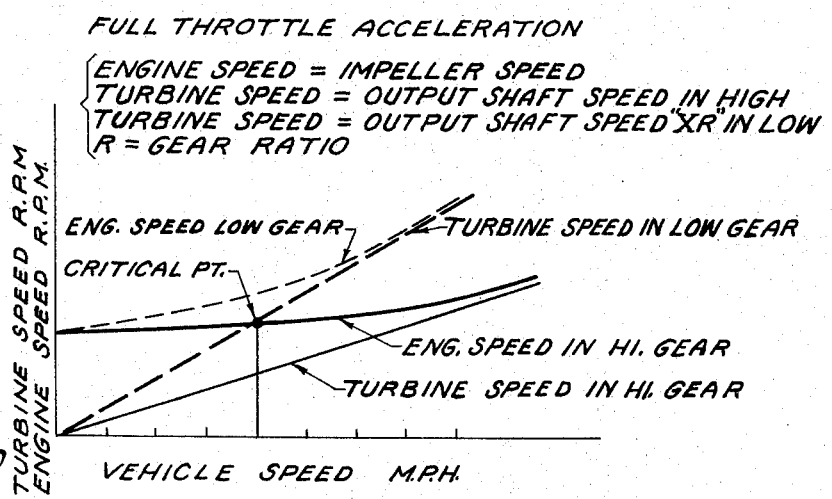
Fig. 10 is a graphical showing of the speeds of various elements in a typical transmission with changes in vehicle speeds during open throttle operation.

Fig. 10 is a graphical representation of typical torque converter turbine and engine speeds plotted against vehicle speeds. The graph indicates full throttle operation and for illustrative purposes the turbine is connected to a two-speed gear such as the embodiment illustrated in Fig. 1. When the planetary gearing is in high gear or direct drive with clutch 7 engaged the turbine speed must be the same as the output shaft speed. When the gearing is in low gear or reduction drive with band 9 applied the turbine speed must be R times the output shaft speed where R equals the gear ratio of the planetary gears when in reduction.

The engine speed and torque converter impeller speeds are considered to be always the same, as usually the engine and impeller are directly connected. It is an inherent characteristic of a fluid torque transmitting device that if the impeller rotates faster than the turbine, the impeller will drive the turbine, that is, in a vehicle transmission the engine will tend to drive the vehicle. If the turbine rotates faster than the impeller the turbine will drive the impeller. This occurs in coasting, for example, when the vehicle will tend to drive the engine.

Referring again to Fig. 10 it should be noted that the engine speed line in high gear crosses the low gear turbine speed line. This point of crossing is a critical vehicle speed so far as the operation of the transmission is concerned. At vehicle speeds below the critical speed the turbine speed is always less than the engine speed regardless of whether the transmission is in its "high gear" condition or "low gear" condition. Thus if a full throttle downshift is made at vehicle speeds lower than the critical speed, the engine, and hence impeller, will always be rotating faster than the turbine and hence the engine will always tend to drive the vehicle. During this range of operation, when the clutch is disengaged, thereby releasing the load on the turbine and engine, the engine immediately speeds up because the throttle is open and the problem is to get the reaction band on as quickly as possible to prevent engine runaway.

At vehicle speeds above the critical speed the low gear turbine speed is greater than the high gear engine speed. If a rapid downshift is made by releasing the clutch and applying the band, the turbine will be driven by the vehicle momentum at R times the output shaft speed whereas the engine initially is rotating at the high gear speed. If the band were applied before the engine could accelerate to a speed above the speed of the turbine in low gear, the turbine would drive the pump and accordingly the vehicle would tend to drive the engine until the engine could speed up to reach a speed above the turbine speed. This change from the engine driving the vehicle to the vehicle driving the engine and then a change back again to where the engine drives the vehicle produces a distinct lurch and objectionable jerk to the occupants of the vehicle. This unpleasant effect is caused by the complete reversal of torque through the entire drive train including the engine, transmission, universal joint and real axle and is also caused by the sudden change in vehicle motion from a rapid acceleration to a deceleration.

To counteract the objectionable reversal of torque during full throttle downshifts above the critical speed, the application of the band must be delayed until the engine has had time to accelerate to a speed above that of the turbine in its low speed condition. This time is a matter of only a fraction of a second but the time can make the difference between a good shift and a poor shift.

To provide for the desired rate of application of the reaction band during a full throttle forced downshift the timing valve 111 as shown in Figs. 4 and 7 is provided. This valve is arranged to provide rapid application of the band during forced downshifts at vehicle speeds below the critical speed and to provide for the desired slower band applications during downshifts at vehicle speeds above the critical speed.

Figure 9:
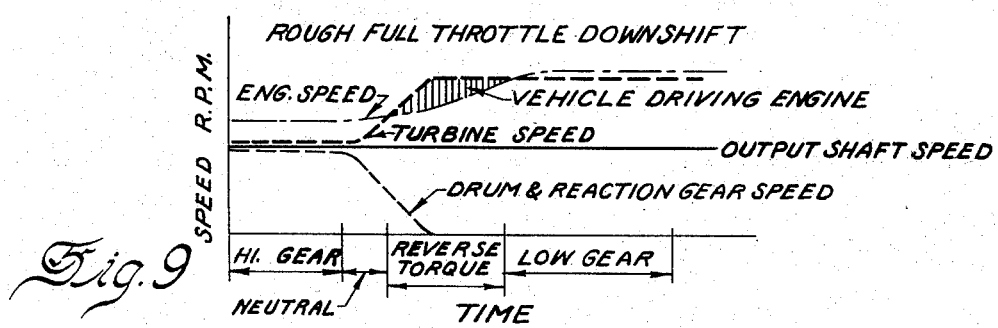
Fig. 9 is a further graphical showing of the speeds of certain element in a transmission during a rough downshift.

Figs. 8 and 9 are shown to illustrate the operation of a transmission during a full throttle downshift at vehicle speeds above the critical speed, Fig. 8 representing an ideal shift and Fig. 9 a rough shift. In Fig. 8 there is plotted engine, turbine and reaction gear speeds against time during a downshift wherein the engine speed is always above the turbine and vehicle. Note that as the turbine speed increases after the direct drive clutch is released the engine always rotates faster than the turbine and when the drum and reaction gear are stationary and the band applied to prevent reverse rotation of the reaction gear, the engine speed is still higher.

Fig. 9 shows a downshift similar to that in Fig. 8 except that the band is applied more rapidly after the clutch is released than in the downshift illustrated in Fig. 8. Note that the turbine speed rises during the shift to a point considerably above the engine speed. This indicates that the turbine will be driving the engine and hence a reversal of torque through the transmission will result until the engine has speeded up the impeller to a speed above that of the turbine. To slow the application of the band to prevent this reversal, the timing valve 111 is provided. With the timing valve 111 in operation all full throttle, downshifts will look like that illustrated in Fig. 8 rather than that in Fig. 9.

Operation

With a manual valve in neutral or park position the engine idling at closed throttle and the vehicle stationary, the pressure regulator valve P or P' will regulate the line pressure at a low level, say for example at 50 p.s.i. Now if the operator places the manual valve in D or automatic drive range, the manual valve permits fluid under pressure to flow through passage 109 and restriction 110 to the apply chamber 129 of the low servo S, whereby piston 100 is moved against springs 104 and 103 to apply the low band 9. With the pressure regulator valve maintaining a low pressure level, valve 112 or valve 147, as the case may be, is in its righthand position whereby the restriction 110 is the sole means whereby the fluid can pass to apply the low band. This means that when the manual valve is moved from neutral or parked position to D position, the band is applied at a slow rate, and held on at a low pressure.

With the manual valve in D position fluid under pressure passes into conduit 109 that leads to automatic shift unit A, but with the vehicle stationary, the springs 60 and 61 hold the shift valve 46 in its righthand position whereby the direct drive clutch apply passage 59 and low band release passage 153 are connected to exhaust port 58. At the same time band 56 blocks passage 33 preventing fluid under pressure from entering the clutch apply and band release passage 59. With the manual valve in D or automatic drive position, passage 29 leading to the reverse servo R is open to exhaust at the top of the manual valve. Spring 154 in the reverse servo acts on piston 155 which in turn acts on lever 156 to hold the reverse band 13 in released position. The transmission is now conditioned for low forward drive with low band 9 applied, the direct drive clutch 7 released by spring 157 and the reverse band 13 released. As the driver opens the throttle, the speed of the engine and hence torque converter pump 2 increases driving the torque converter turbine 3 at a reduced rate with increased torque in a well known manner. Gearing input shaft 5 driven by turbine 3 drives through the planetary gearing which further reduces the speed and increases the torque to the output shaft 14. The vehicle then begins to move. As the engine speeds up the front pump 15 also speeds up thereby increasing its output. When the output reaches a certain value the pressure regulator valve P or P' begins to regulate the pressure at a higher pressure, increasing from the 50 p.s.i. low level up to the 90 p.s.i. maximum level. This increase in pressure results in an increase in the low band 9 torque capacity. As mentioned above in the description of the pressure regulator valve P, the pressure increases from the 50 p.s.i. level to the 90 p.s.i. level as the square of the output from the pumps. Because the torque transmitted by the torque converter likewise increases as the speed of the engine shaft, the pressure will rise proportionately with the torque from the torque converter, and hence apply the band with a force that varies with its torque load.

As the vehicle speed increases the governor G causes an increase in governor pressure in line 67. This pressure when high enough acts on the shift valve 46 to overcome the force of the shift valve springs 60 and 61 as well as the force of the TV pressure in line 50 as controlled by the throttle regulator valve 44. At this time the shift valve 46 will move to the left allowing regulated line pressure in line 33 to pass between lands 56 and 57 of shift valve 46 into the clutch apply passage 59. The fluid under pressure in line 59 acts on the clutch apply piston 158 and at the same time acts through passage 153 on the release side of the low servo piston 100 to aid the springs 103 and 104 in overcoming the servo apply pressure in chamber 129 to move the piston 100 and rod 102 to release the band 9. The low servo acts as an accumulator for the buildup of pressure on the clutch apply piston 158 and the clutch 7 is fully applied about the same time the low band 9 has been released sufficiently to allow the drum 108 to slip. The vehicle is now in direct drive with clutch 7 locking the planetary gearing up as a unit.

With the transmission in direct drive there are various conditions under which a downshift to low drive can be effected. For example, if the speed of the vehicle decreases sufficiently so that the pressure in line 67 as produced by the governor G is insufficient to hold shift valve 46 against movement to the right by springs 60 and 61 and the force of TV pressure in line 50 acting on the plug 64, the shift valve 46 will return to its right hand position as shown in Figs. 1 and 2. Now the clutch apply passage 59 connected to exhaust port 58 allows the pressure in line 59 and the low band release passage 153 to drop. Main line pressure in line 109 now is sufficient to move the piston 100 against springs 103 and 104 to its right-hand or band apply position to fill the increased volume in chamber 129. As the piston moves to the right fluid must flow from line 109 into the chamber 129. This flow is controlled by the timing valve assembly T or T' as the case may be. If the downshift is occurring with the throttle in closed position, as in the case of a coast-down downshift, the speed at which a downshift occurs will be at a fairly low point, and under these conditions the pressure regulator valve P or P' will be regulating the line pressure at the low level of 50 p.s.i., in which case the timing valve 112 or 147 will be held in its righthand position whereby flow to the chamber 129 is only through the restriction 110. This means that the band will be applied at a relatively slow rate under these conditions.

With the vehicle moving below a certain maximum speed, for example approximately 40 m.p.h., the driver can, by depressing foot accelerator past the wide open throttle position, move the downshift sleeve 52 to a position whereby throttle pressure in line 50 will pass through to conduit 55 and act on the lefthand end of the shift valve 46 and with the help of springs 60 and 61 can move the shift valve to the right against the force of governor pressure in line 67 that acts on the righthand side of the shift valve. Of course, if the governor pressure is sufficiently high, for example above 40 m.p.h., TV pressure cannot move the shift valve 46 to its downshifted position. With the shift valve 46 being downshifted or moved to the right by the action of the driver in depressing the accelerator pedal past wide open throttle position, clutch apply passage 59 and band release passage 153 will be exhausted through port 58 as was the case in the closed throttle or coast-down downshift described above. The pressure in line 109 will also act in chamber 129 on piston 100 to apply the low band 9. However, under these conditions the regulator valve P or P' will be maintaining the line pressure at the maximum level, for example 90 p.s.i., as the engine and vehicle driven pumps both have a large output of fluid. With the line pressure being maintained at the maximum value, valve 112 or valve 147, as the case may be, will be in its lefthand position whereby passage 114 is directly connected with the chamber 129. Now if the speed of the vehicle is above the critical speed referred to above, for example 25 m.p.h., the governor pressure in line 118 will be sufficiently high to move the valve 111 to a position whereby fluid can pass from line 109 to passage 114 only through the restriction 120. This means that fluid can flow from passage 109 into the chamber 129 through both restriction 110 and restriction 120 and whereby the band 9 will be applied at a faster rate than was the case during a closed throttle or coast-down downshift.

The flow to the low servo is still sufficiently restricted to give the engine sufficient time to raise the speed of the impeller 2 to a point above the speed the turbine will have after the band is applied and the gearing in reduction drive. This will prevent reversal at torque during the downshift as explained above.

If, upon making a forced downshift as described above, the vehicle speed is below approximately 27 m.p.h. the governor sensitive valve 111 will be in its righthand position as shown in Figs. 1, 4 and 7. This is so because under this condition the governor pressure in line 118 cannot overcome the force of the springs 115 or 145. With the valve 111 in its righthand position there is unrestricted flow from line 109 to passage 114 through the line pressure sensitive valve 112 or 147 to the band apply chamber 129. This means that the band will be applied at a still faster rate than was the case in the closed throttle downshift or the forced downshift above 27 m.p.h.

The fast rate of flow to the servo is possible under low speed open throttle downshifts because the impeller 2 will always be rotating faster than the turbine, even though the turbine is being driven at R times the output shaft 14 speed.

A downshift can also be initiated by moving the manual valve M from D to L position. The timing valves then act to regulate the rate of flow, and hence rate of band application, in the same manner as an accelerator pedal full throttle forced downshift. Thus if the vehicle speed is above 27 m.p.h. the speed responsive timing valve 111 will be in its lefthand or restricted flow position and the line pressure sensitive timing valve 112 in its lefthand or full open position. The rate of band application will then be controlled by the restrictions 110 and 120 which will produce an intermediate rate of band application.

If a manual valve downshift is made below 27 m.p.h., but above about 10–15 m.p.h., both the speed responsive timing valve 111 and the line pressure sensitive timing valve will be in their open position. The rate of band application will then be unrestricted and the band applied rapidly. With a manual valve downshift between 10–15 m.p.h. and with the throttle in closed position the line pressure as regulated by the regulator valve P may be below 65 p.s.i. which would allow the line pressure sensitive valve 112 to close, in which case the band will be applied at a slow rate. On the other hand if a manual valve downshift is initiated at low speeds with the throttle opened, the regulator valve P will be maintaining the line pressure above 65 p.s.i., which is enough to move the line pressure sensitive valve 112 to open position, in which case the flow to the servo S will be unrestricted and hence the band applied rapidly.

It can be seen from the above that the timing valves in combination with the pressure regulator valve, act to cause different rates of application of the reduction band under different operating conditions of the transmission. These different rates of band application are desirable for effecting smooth and efficient downshifts during different torque and speed conditions. Thus, for example, with the engine idling or being driven through the transmission by the vehicle wheels the torque transmitted by the transmission is at a fairly low level, and to effect a smooth application of the band 9 a slow application of the band is desirable. It will be seen from the above description of operation that the timing valves, in cooperation with the pressure regulator valve, act to produce such a result. When the downshifts occur with the engine driving the vehicle as would be the case during a forced downshift it is desirable that the band be applied at a faster rate, for example, to prevent engine runaway, and again it can be seen from the above description of the operation, the timing valves cooperating with the regulator valve perform this desired result. When the vehicle is traveling at a relatively high speed, as for example 27 m.p.h., the engine must have time to accelerate to a faster speed to prevent reversal of torque during the downshift, and here again the timing valves in applicant's control system act to give the desired operation.

Other advantages and features for the transmission and control system described above are believed to be obvious to one skilled in the art.

While this specification describes in detail only the preferred embodiments of the invention, it is intended that equivalent structures embodying the principles and features as would occur to those persons skilled in the art are within the scope of the invention for which protection is sought and such scope must be limited only by the appended claims.

What is claimed is:

1. In a control system for a vehicle transmission having a fluid actuated servo member, a fluid pressure source, a pressure regulator valve for changing the pressure level of fluid supplied by said source to said servo, a manually controlled selector valve adapted to supply said fluid at its regulated pressure level from said source to said servo to actuate the same, a shift valve, said selector valve at times supplying said fluid at its regulated pressure lever to said shift valve, said shift valve at times being operable to supply said fluid at its regulated pressure level from said selector valve to said servo to deactuate the same, and flow control means between hydraulically connecting the selector valve and said servo and controlling the rate of flow of said actuating fluid to and from said servo, said flow control means being responsive to vehicle speed and changes in the level of pressure maintained by the pressure regulator valve whereby under different speed and pressure level conditions the servo is actuated at different rates.

2. The control system of claim 1 wherein the flow control means includes at least one timing valve, said timing valve being biased to normally allow only restricted flow to said servo, said valve being responsive to changes in the level of pressure of said pressure regulated fluid in the system to allow unrestricted flow.

3. The control system of claim 1 wherein the flow control means includes branched passages between said selector valve and said servo, a first passage having a flow restriction therein and a second passage having a timing valve therein, said timing valve being normally biased to close said second passage, said timing valve being responsive to a predetermined pressure of fluid from said source, as controlled by said pressure reegulator valve, to open said second passage to allow unrestricted flow to said servo.

4. The control system of claim 1 including a vehicle speed responsive governor adapted to deliver a variable fluid pressure that increases with vehicle speed, said flow control means including a timing valve normally biased to permit a restricted flow from said selector valve to said servo, said timing valve being responsive to variations in pressure of the fluid from said governor, and upon increase in said pressure above a predetermined amount to permit unrestricted flow from said selector valve to said servo.

5. The control system of claim 1 wherein said flow control means includes a plurality of timing valves controlling restricted and unrestricted passages leading from said selector valve to said servo, a first one of said timing valves normally closing an unrestricted passage and forcing fluid under pressure from said selector valve to flow through a first restricted passage, said first timing valve being responsive to an increase in the pressure level of fluid supplied by said source to open said unrestricted passage, a second of said timing valves in series with said first timing valve normally allowing unrestricted flow, a vehicle speed governor, said second valve being responsive to an increase in speed of said governor to close said unrestricted passage and force said fluid under pressure to flow through a second restricted passage.

6. The control system of claim 1 wherein said pressure regulator valve is responsive to both vehicle engine speed and vehicle speed.

7. The control system of claim 1 wherein said pressure regulator valve regulates the fluid pressure from said source according to vehicle engine speed and vehicle speed, said regulator valve regulating the pressure at a relatively low level when both the engine speed and vehicle speed are relatively low and regulating the pressure at a relatively high level when either the engine speed or vehicle speed are relatively high.

8. In a control system for a transmission having an input shaft, an output shaft, and gearing for transmitting drive between said shafts, said gearing being controlled by fluid pressure actuated means, a first pump responsive to the speed of said input shaft, and a second pump responsive to the speed of said output shaft, a variable pressure regulator valve for controlling the pressure level of fluid supplied by said pumps, said regulator valve being responsive to low volume output of both of said pumps to regulate pressure at a low level and responsive upon a predetermined increase in output of said pumps to regulate pressure at a higher level, selector valve means to selectively supply fluid under pressure from said pumps to said pressure actuated means, an output shaft speed responsive governor adapted to produce a governor pressure which increases with an increase in output shaft speed, timing valves for controlling the rate of flow of fluid from said selector valve means to said pressure actuated means, said timing valves being responsive to changes in the pressure level of the fluid supplied by said pumps and changed by said regulator valve and to the pressure level of fluid produced by said governor, whereby the rate of actuation of said pressure actuated means is determined by the speed of the input and output shafts.

9. The transmission control system of claim 8 wherein said timing valves are arranged to permit a slow flow of fluid to said pressure actuated means when the pressure of fluid supplied by said pumps is being regulated by said regulator valve at a low level regardless of the pressure produced by said governor, said timing valves arranged to permit a faster flow of fluid to said pressure actuator means when the pressure of fluid supplied by said pump is being regulated by said regulator valve at a high level and said governor is producing a governor pressure above a predetermined amount, and said timing valves allowing a still faster flow of fluid to said pressure actuated means when the pressure of fluid from said pump is regulated at a high level and said governor pressure is below said predetermined amount.

10. A transmission including a control element actuated by a fluid operated piston, selector means for directing fluid under pressure to said piston to operate said control element, pressure regulator means for changing the level of pressure of said fluid, first speed responsive means controlled by the speed of at least one rotating element of said transmission and acting on said pressure regulator means to change the level of pressure of said fluid, a second speed responsive means controlled by the speed of one rotating element of the transmission, flow rate control means including restricted and unrestricted passages interposed between said selector means and said piston controlling the rate of actuation of said control element, said flow control means including a first valve responsive to changes in the level of pressure of said fluid and a second valve controlled by said second speed responsive means, said valves opening and closing said unrestricted passages to control the rate of flow to said piston.

11. The transmission set forth in claim 10 wherein the second speed responsive means is controlled by the speed of the transmission output.

12. The transmission set forth in claim 10 wherein the first speed responsive means is controlled by speeds of both the input and the output of the transmission.

13. The transmission set forth in claim 12 wherein the second speed responsive means is controlled by the speed of the transmission output.

14. In a transmission having a fluid actuated member adapted to change the gear ratio of the transmission, a source of fluid under pressure, speed responsive means to change the level of pressure of said source, selector valve means at times directing fluid from said source to said fluid actuated means to establish a particular gear ratio, flow control means for controlling the rate of flow of fluid from said selector valve means to said fluid actuacted means to vary the rate of establishment of said particular gear ratio, said flow control means including a plurality of passages controlled by a plurality of independent valves, certain of said passages including restrictions, means for independently operating said valves, said operating means for one of said valves being responsive to said change in the level of the fluid supplied by said source.

15. The transmission set forth in claim 14 wherein the operating means for another of said valves is responsive to the speed of at least one of the elements of the transmission.

16. The control system of claim 1 wherein when said regulated pressure level of said fluid is relatively low the servo member will be actuated at a slow rate, when the regulated pressure level of said fluid is relatively high and the vehicle speed is relatively high the servo member will be actuated at an intermediate rate, and when the regulated pressure level of said fluid is relatively high and the vehicle speed relatively low the servo member will be actuated at a rapid rate.

References Cited in the file of this patent

UNITED STATES PATENTS

| | | |
|---|---|---|
| 2,576,336 | Farkas | Nov. 27, 1951 |
| 2,603,235 | Kirkham | July 15, 1952 |
| 2,633,035 | Livermore | Mar. 31, 1953 |
| 2,640,373 | Jandasek | June 2, 1953 |
| 2,645,137 | Roche | July 14, 1953 |
| 2,667,085 | Ackerman | Jan. 26, 1954 |
| 2,679,768 | Baule | June 1, 1954 |
| 2,689,029 | McFarland | Sept. 14, 1954 |
| 2,691,903 | McRae | Oct. 19, 1954 |
| 2,691,940 | McFarland | Oct. 19, 1954 |
| 2,737,824 | Livermore | Mar. 13, 1956 |
| 2,740,304 | Sheppard | Apr. 3, 1956 |

FOREIGN PATENTS

| | | |
|---|---|---|
| 704,787 | Great Britain | Mar. 3, 1954 |
| 1,023,949 | France | Mar. 25, 1953 |

UNITED STATES PATENT OFFICE

CERTIFICATE OF CORRECTION

Patent No. 2,896,478                          July 28, 1959

Frank J. Winchell

It is hereby certified that error appears in the printed specification of the above numbered patent requiring correction and that the said Letters Patent should read as corrected below.

Column 2, line 11, for "is provide" read -- is to provide --; column 3, line 4, strike out "the", first occurrence; line 29, for "cluutch" read -- clutch --; column 12, line 74, for "band" read -- land --; column 15 line 68, strike out "between"; column 18, list of references cited, under the heading "FOREIGN PATENTS", add the following reference -

140,276 Sweden (General Motors) - - May 5, 1953

Signed and sealed this 1st day of March 1960.

(SEAL)
Attest:

KARL H. AXLINE                                          ROBERT C. WATSON
Attesting Officer                                      Commissioner of Patents